United States Patent
Elsner et al.

(10) Patent No.: US 6,888,471 B2
(45) Date of Patent: May 3, 2005

(54) SENSOR SYSTEM FOR DETECTING DIMENSIONAL VARIABLES TO BE MEASURED ON A ROTATING OBJECT

(75) Inventors: Bernhard Elsner, Kerpen (DE); Henry Heidemeyer, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,094

(22) PCT Filed: Apr. 5, 2001

(86) PCT No.: PCT/DE01/01323

§ 371 (c)(1),
(2), (4) Date: Jun. 16, 2003

(87) PCT Pub. No.: WO01/89896

PCT Pub. Date: Nov. 29, 2001

(65) Prior Publication Data

US 2004/0036590 A1 Feb. 26, 2004

(30) Foreign Application Priority Data

May 23, 2000 (DE) ........................................ 100 25 502

(51) Int. Cl.⁷ .............................................. G08B 21/00
(52) U.S. Cl. ..................... 340/686.3; 340/442; 340/539
(58) Field of Search ...................... 340/686.3, 442–448, 340/539, 439, 440

(56) References Cited

U.S. PATENT DOCUMENTS

| 4,300,119 | A | * | 11/1981 | Wiernicki ................... 340/447 |
| 5,006,844 | A | * | 4/1991 | Ohta et al. .................. 340/448 |
| 5,440,300 | A | * | 8/1995 | Spillman, Jr. ............. 340/10.34 |
| 6,378,360 | B1 | * | 4/2002 | Bartels ....................... 73/146.5 |
| 6,501,372 | B1 | * | 12/2002 | Lin ............................. 340/442 |

FOREIGN PATENT DOCUMENTS

| DE | 197 02 768 C1 | 4/1998 |
| EP | 0 937 615 A | 8/1999 |
| WO | 93 25400 A | 12/1993 |

* cited by examiner

Primary Examiner—Jeffery Hofsass
Assistant Examiner—Eric Blount
(74) Attorney, Agent, or Firm—Michael J. Striker

(57) ABSTRACT

A sensor system for detecting at least one dimensional variable of a rotating object (30) includes a plurality of sensors (33) disposed on the rotating object (30) that are sensitive to the dimensional variable and an antenna array (11) for supplying the sensors (33) with high-frequency energy and for receiving a high-frequency signal, modulated by the variable to be detected, from the sensors (33). The sensors are disposed on the object (30), distributed in the circumferential direction, and the antenna array (11) has a directional characteristic (34) for transmission and/or reception which is stationary with respect to a coordinate system not rotating with the object (30) and which includes only a subregion (32) of the object (30).

22 Claims, 4 Drawing Sheets

SENSOR SYSTEM FOR DETECTING DIMENSIONAL VARIABLES TO BE MEASURED ON A ROTATING OBJECT

The present invention relates to a sensor system for remote detection of at least one dimensional variable, which is measured at a rotating object.

BACKGROUND OF THE INVENTION

The capability of remote polling of a sensor is necessary in many kinds of application, especially wherever it is problematic to establish a permanent physical connection between a sensor and an associated evaluation unit, by way of which connection output signals of the sensor can be transmitted to the evaluation unit. Such connection problems arises wherever the sensor is moved relative to the associated evaluation unit, especially when rotary motions are involved. Examples of this that can be given are detecting the pressure in a pneumatic tire mounted rotatably on a vehicle, or measuring the torque on a rotating shaft.

These applications require the transmission of output signals of the sensor electromagnetically, in the broadest sense; that is, the transmission of radio signals, microwave signals, or light signals. One possibility of doing so is to equip the sensor element with its own power supply, to furnish the energy needed for the measurement and for transmitting the output signals. However, this principle quickly reaches its limits because of the attendant costs (battery), the relatively high weight of the sensor unit, and the requisite maintenance, since the battery has to be replaced after a certain time in operation.

It is therefore desirable to make the sensor entirely passive, or in other words to embody it without its own power supply, in order to circumvent the problems associated with the battery and to make the sensor smaller, lighter in weight, and less vulnerable.

One example of a sensor system with sensors that can be remotely polled electromagnetically is discussed in German Patent DE 19 702 768 C1. The sensor system known from this reference includes the following:

a sensor, disposed on the rotating object and sensitive to the dimensional variable, and means for forwarding the signals of the sensor to a processing device, which means include an antenna array for supplying the at least one sensor with high-frequency energy and for receiving a high-frequency signal, modulated as a function of the variable to be detected, from the sensor.

This sensor system is suitable for detecting dimensional variables of the rotating object that are essentially constant throughout the entire object, so that the precise location where a measurement is made is not critical.

However, if it is critical to detect dimensional variables whose values are not uniform throughout the object, then the known sensor system rapidly reaches its limits. Measurements can still be performed in subregions of the rotating object if these subregions rotate jointly with the object, or in other words if the sensor can be disposed at the subregion of interest and can rotate jointly with it; but if it is critical to detect dimensional variables in a subregion of the rotating object that is stationary relative to a coordinate system that does not rotate with the object, then the known system is taxed beyond its capabilities.

SUMMARY OF THE INVENTION

By means of the present invention, a sensor system for detecting at least one dimensional variable of a rotating object is created that makes it possible in a simple way to detect a dimensional variable in a subregion of the rotating object that is stationary with respect to a coordinate system that does not rotate with the object.

These advantages are attained by providing that a plurality of sensors are disposed on the object, distributed in the circumferential direction, and that the antenna array has a directional characteristic for transmission and/or reception which is stationary with respect to a coordinate system not rotating with the object and which includes only the subregion of the object.

In the course of the rotation of the object, many of the sensors disposed on it move successively through the subregion, where they can come to interact with the antenna array. This means that only when the affected sensors are located in the subregion are they supplied with high-frequency energy that enables them to broadcast an answering radio signal, and/or that an answering radio signal broadcast by the sensors will be received by the antenna array only when the affected sensor is located in the subregion.

The subregion can advantageously be a contact face of the object, with a substrate. It is then possible for instance to measure contact forces that are operative between the object and the substrate while the object is rolling over the substrate.

To keep the system simple and compact, it is preferred that the antenna array includes a common antenna for both sending high-frequency energy to the sensors and receiving an answering signal from the sensors.

Sensors that are used to detect the same physical variable can expediently have a spacing in the circumferential direction of the object that is essentially equivalent to the length of the subregion in the circumferential direction. In this way, it is assured that over the course of the rotation of the object, there is one sensor for the applicable dimensional variable located in the subregion at all times, so that a continuous measurement of the dimensional variable is assured.

It is especially preferable that the sensors have coding, which makes it possible to supply high-frequency energy selectively to at least one sensor from among a plurality of sensors located in the subregion, or to receive selectively from at least one sensor located in the subregion. Such a provision makes it possible to stagger the sensors on the circumference of the rotating body closer together than would be equivalent to the length of the subregion in the circumferential direction; since the sensors can be polled selectively, however, the dimensional variable can be determined with a local resolution that is finer than the length of the subregion.

Especially easy identification of the sensors is provided for it the sensors form n groups, which are each distributed cyclically over the circumference of the object.

To assure an unambiguous association of the measured values with the various sensors furnishing them, it is preferred that the subregion is defined such that the sensors of all n groups are never all located in it at the same time.

It is also expedient that each sensor has a first resonator, which can be excited by a modulated measurement frequency of a carrier frequency of the high-frequency energy, and whose resonant frequency is variable as a function of the dimensional variable. This resonant frequency may be modulated to an answering radio signal, which the sensor sends to the antenna array, so that from the modulation frequency, a processing device connected to the ant can conclude what the value of the dimensional variable to be detected is.

This resonator preferably includes a surface wave resonator or a quartz oscillator as an element capable of oscillation. Also, a discrete component that is sensitive to the dimensional variable is preferably also incorporated into the first resonator, which makes it possible to use economical standard components as the element capable of oscillation.

The use of resonators with a resonant frequency that is variable as a function of the dimensional variable also has the advantage that the aforementioned coding can be achieved by assigning each sensor in the sensor system its own specific resonator tuning range. This makes it possible, on the basis of the modulation frequency of the answering radio signal, arriving at the antenna array from a sensor, to conclude what the identity of the transmitting sensor is.

If the tuning ranges of the individual first resonators of various sensors partly overlap, then an association of the received answering radio signal with a sensor can be made taking into account the reception field intensity at the antenna array as well. A simpler association is obtained, however, if the resonator tuning ranges of the individual codings are disjoint.

A preferred application of the sensor system of the invention is the detection of vectorial variables, in particular forces or accelerations. If for instance the rotating object is a vehicle tire, then detecting such variables makes it possible to detect dangerous situations, such as aquaplaning, inadequate adhesion of individual wheels of the vehicle in cornering, and so forth, and to generate a warning to the vehicle driver accordingly.

In such a case, it is often not necessary that all three components of the vectorial variable be detected; in the instances given above, it is sufficient if the sensors are each designed for detecting two components of the dimensional variable that are perpendicular to one another and tangential to the surface of the object. A conclusion as to the value of a component of the vectorial variable that is oriented radially to the tire can be drawn by measuring the tire pressure, for instance.

It is also advantageous that each sensor has a second resonator that can be excited by a carrier frequency of the high-frequency energy. This second resonator makes it possible to store the high-frequency energy for a limited time, so that it is available for generating the answering radio signal. This has the advantage, first, that the sensor for generating the answering radio signal need not rely on simultaneously transmitting the high-frequency energy through the antenna array, because during a pause in the supplying of high-frequency energy, the second resonator is capable of furnishing the energy required for sending the answering radio signal. Since there can be pauses in the supplying of the high-frequency energy, it is conveniently possible to use the same antenna, at staggered times, both to supply the high-frequency energy to the sensors and to receive their answering radio signal. Thus the first resonator makes it possible to construct the sensor as a passive element, without its own power supply.

A further advantage of using the second resonator is that it enables selective excitation of individual sensors by means of a polling radio signal, with a carrier frequency tuned to the second resonator, or, in an environment in which at lead one sensor each is assigned to a plurality of polling units, it enables each polling unit and its assigned sensors to be allocated a specific carrier frequency that enables the polling units to answer and poll its assigned sensors selectively.

As the second resonator, surface wave resonators are especially preferred.

Surface wave resonators of the kind that are capable of generating a delayed output oscillation pulse in reaction to an induced oscillation pulse are especially advantageous. During a first time interval that is meant to be shorter than the delay in the second resonator, such resonators can be excited to an oscillation; the energy stored in this oscillation, however, is not available to the sensor as driving energy until there is a pause in the high-frequency energy supply through the antenna array. As long as the delay persists, the energy is stored in the second resonator with only slight losses, dictated by the oscillation damping of the resonator substrate.

Such a delay can be achieved easily with the aid of a propagation distance for the surface wave that a surface wave induced in the second resonator must traverse before it is picked up.

Such resonators can be embodied for instance as surface wave filters, with a first pair of electrodes for inducing the surface wave and with a second pair of electrodes, three-dimensionally spaced apart from the first, for picking up the surface wave; the two pairs of electrodes can be separated from one another by the propagation distance.

Alternatively, they can be embodied as resonators with a single pair of electrodes, which then serves both to induce and to pick up the surface wave; reflector electrodes are each spaced apart from the first pair of electrodes, for reflecting the surface wave, being propagated in the resonator substrate, with a time lag relative to the first pair of electrodes.

Further characteristics and advantages of the invention will become apparent from the ensuing description of exemplary embodiments in conjunction with the appended drawings.

BRIEF DESCRIPTION OF THE DRAWINGS

Shown are

FIG. 6 is used.

DETAILED DESCRIPTION OF THE PREFERRED EMBODIMENTS

Figure 1:
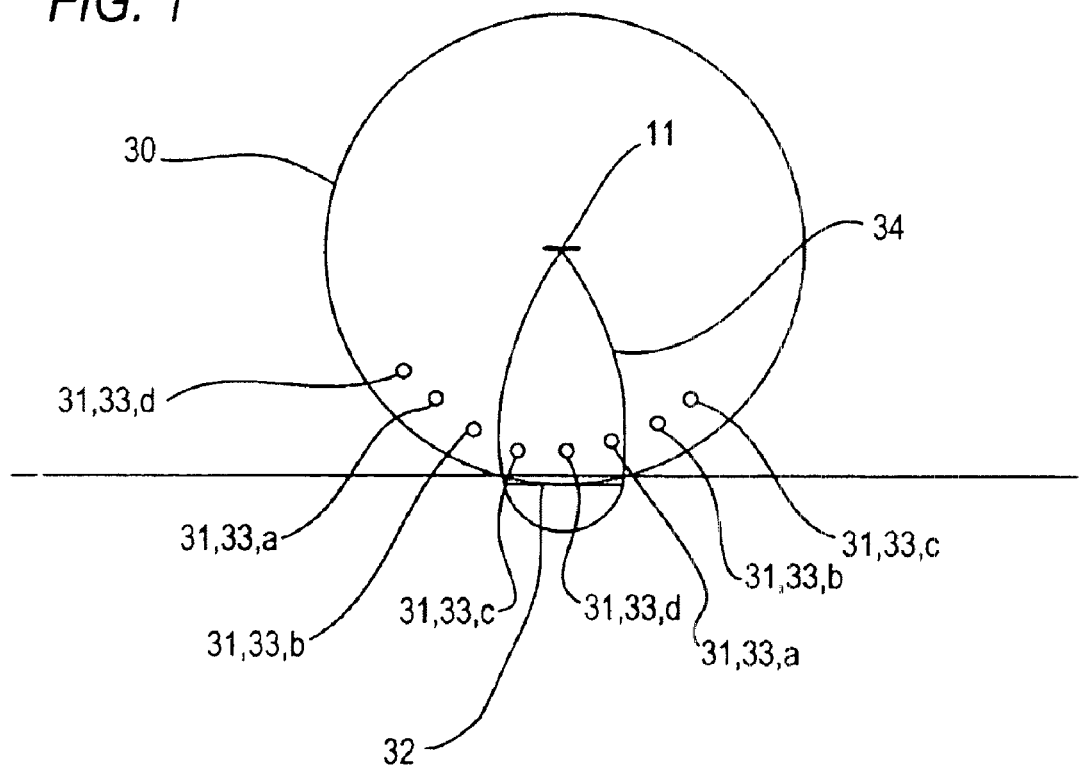
FIG. 1, a schematic illustration of a vehicle wheel that is equipped with a sensor system of the invention, in a first exemplary embodiment.

FIG. 1 shows a first example of a vehicle wheel, with a pneumatic tire 30 that is equipped with a sensor system of the invention. Many sensors 33 are disposed in the running surface of the pneumatic tire; they can for instance be embedded in tread elements of the pneumatic tire, or in the region of the (steel) jacket.

The sensors 33 may be capacitive or inductive sensors, whose makeup and mode of operation will be addressed in further detail hereinafter in conjunction with FIG. 3.

The sensors 33 are intended for measuring the deformation of the profile of the pneumatic tire 30 in a subregion of the pneumatic tire 30, namely in its flattened contact face 32 with the road.

An antenna 11 is disposed in the vicinity of the axle of the wheel and has a directional characteristic oriented toward the flattened region 32; this directional characteristic is represented here by the lobe 34.

Figures 3, 4:
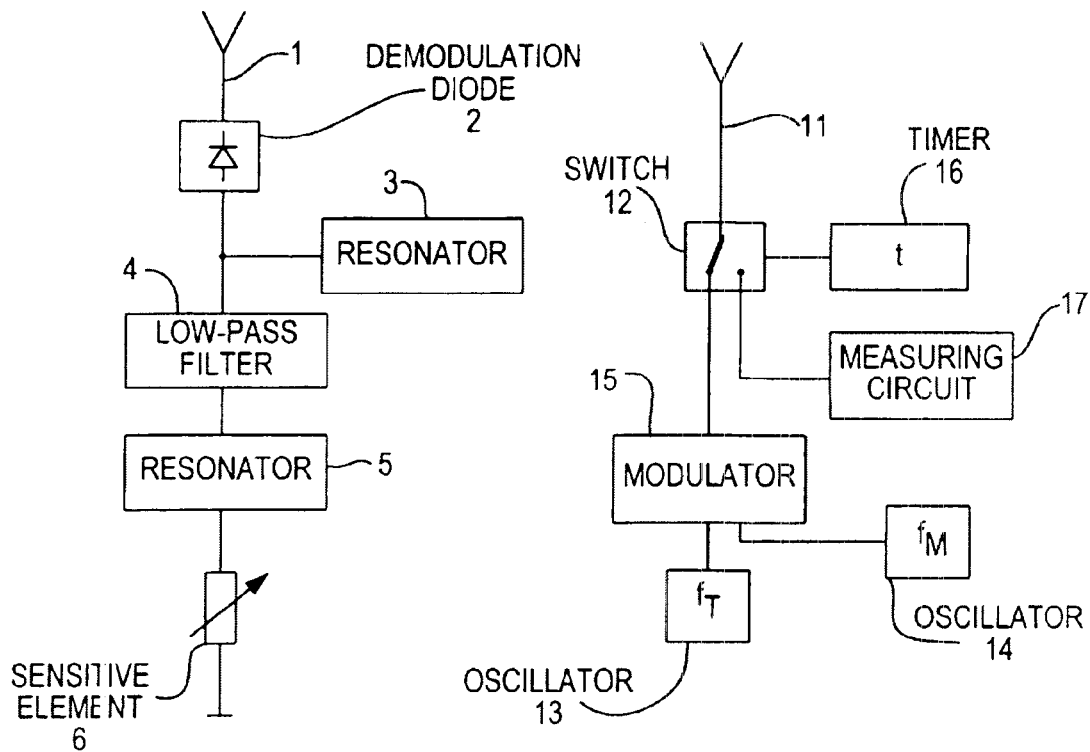
FIG. 3, a block diagram of a sensor of the vehicle wheel of FIG. 1.
FIG. 4, a block diagram of a polling unit for the sensor of FIG. 2.

The antenna 11 is part of a polling unit, which is shown in FIG. 4 in the form of a block diagram. An oscillator 13 is located in the polling unit and generates a signal, here called the polling carrier signal, with a carrier frequency $f_T$ in the range of 2.54 GHz. The carrier frequency is preferably purposefully variable by several MHz. A second oscillator 14 generates a polling measurement signal in the form of an oscillation with a frequency $f_M$ in the range from 0 to 80 MHz. When the polling unit is used to poll a plurality of sensors, the measurement frequency $f_M$ is expediently also variable purposefully, specifically in increments that correspond to the size of the resonant range of a first resonator of the sensors, which will be addressed in further detail hereinafter.

A modulator 15 is connected to the two oscillators 13, 14 and modulates the polling measurement signal to the polling carrier signal and thus generates a polling radio signal that is output to a switch 12. The switch 12 is under the control of a timer 16, which alternately connects a sending and receiving antenna 11 with the output of the modulator 15 and the input of a demodulation and measuring circuit 17, which acts as a processing device for extracting the values of the dimensional variables to be detected from the answering radio signals received. The modulation performed by the modulator 15 can in particular be amplitude modulation or quadrature modulation; the demodulation performed in the demodulation and measuring circuit 17 is complementary to it.

The makeup of the sensors 33 is shown in FIG. 3 in the form of a block diagram. The polling radio signal broadcast by the antenna 11 is received by an antenna 1 of the sensor shown in FIG. 3. A demodulation diode 2, such as a Schottky or detector diode, is connected to the antenna. Such a diode is distinguished by an essentially parabolic characteristic curve even in the vicinity of the origin in the coordinate system and thus by a highly nonlinear behavior, which leads to mixing of the spectral components contained in the polling radio signal, and thus to the generation of a spectral component with the frequency $f_M$ of the measurement signal at the output of the demodulation diode 2. The spectral component at the carrier frequency $f_T$ that also appears at the output of the demodulation diode 2 serves to excite a resonator 3, in this case called the second resonator.

A low-pass filter 4, and downstream of the low-pass filter 4, a so-called first resonator 5 are connected to the output of the demodulation diode 2; together with an element 6 sensitive to the dimensional variable, this first resonator forms an oscillating circuit. The first resonator 5, just like the second resonator 3, is a commercially available component, such as a quartz oscillator or a surface wave resonator. By means of the interconnection with the sensitive element 6, the resonant frequency of the first resonator 5 is variable as a function of the dimensional variable.

The purpose of the low-pass filter 4 is essentially to keep spectral components in the range of the carrier frequency $f_T$ away from the first resonator 5 and thus to prevent their dissipation in the first resonator 5. In this way, the low-pass filter 4 on the one hand accomplishes more-effective excitation of the second resonator 3, as long as the polling radio signal is being received by the antenna 1; when there is a pause in the polling radio signal, the low-pass filter 4 also limits the attenuation of the second resonator 3.

The sensitive element 6 is an inductive or capacitive element, such as a micromechanical pressure sensor element with two capacitor plates movable relative to one another as a function of an exerted force or acceleration. Such an element 5 essentially affects only the resonant frequency but not the attenuation of the first resonator 5.

Since such a sensor is sensitive only to a force or acceleration component in one direction in space, three sensors 33 are provided at every circumferential position 31 on the pneumatic tire 30 of FIG. 1: two sensors for the directions tangential to the surface of the pneumatic tire, one being in the direction of vehicle travel and the other being transverse to it, and a third sensor for the radial direction.

Figure 5:
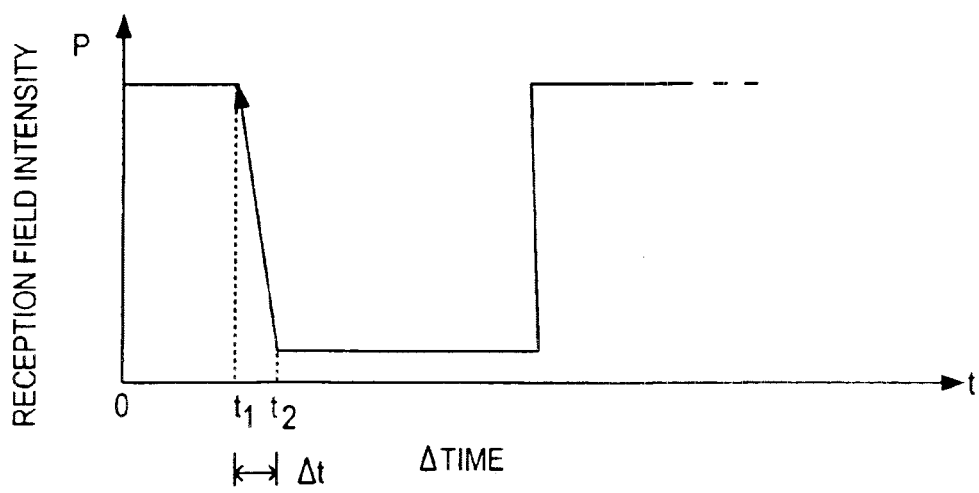
FIG. 5, the course over time of the intensities of the radio signals at the antenna array of the polling unit of FIG. 3.

FIG. 5 schematically illustrates the course of the reception field intensity P at the antenna 11 of the polling unit as a function of the time t in the course of one polling cycle. The reception field intensity P is plotted on a logarithmic scale. During a period of time from t=0 to t=$t_1$, the polling radio signal is broadcast and is thus necessarily some orders of magnitude stronger than the echo signals thrown back from the environment of the polling unit or than an answering signal possibly furnished by a sensor.

At time $t_1$, the switch 12 connects the antenna 11 with the demodulation and measuring circuit 17 and the broadcasting of the polling radio signal is interrupted. During a brief period of time [$t_1$, $t_2$], echos of the polling radio signal arrive at the antenna 11, having been thrown back by obstacles various distances away in the environment of the antenna 11.

Once these echo signals have faded, the only signal that then arrives at the antenna 11 is an answering radio signal, which has been generated in the sensor 33 by mixing of the oscillations of the two resonators 4, 5 by the diode 2 functioning as a modulator and has been broadcast via the antenna 1. The demodulation and measuring circuit 17 therefore waits out a predetermined length of time Deltat after the switchover of the switch 12 before beginning to examine the answering signal received at the antenna 11 as to its frequency and/or attenuation and thus to extract the information it contains about the dimensional variable.

The delay Deltat can be fixedly specified as a function of the transmission and reception power of the polling unit, for example in such a way that for a given model of polling unit, a maximum range at which echo signals are still detectable by the polling unit is determined, and the delay Deltat is selected to be at least twice the transit time that is equivalent to this range.

Since during the delay period Deltat the oscillations of the resonators 3 and 5 also face, however, it is more advantageous to select as short as possible a delay period Deltat as a function of the particular environment in which the polling unit is used; for example for a specific usage environment, the maximum distance of a potential echo source from the polling unit is determined, and the delay is selected to be at least equal to twice the signal transit time from the sensor element to the polling unit, and thus precisely long enough that an echo from that source will not be evaluated. In the sensor system shown in FIG. 1, the time equivalent to the transit time of a radio signal from the antenna 11 to the roadway in the vicinity of the flattened region 32 and back to the antenna 11 again can be selected as the delay period Deltat.

Figure 6:
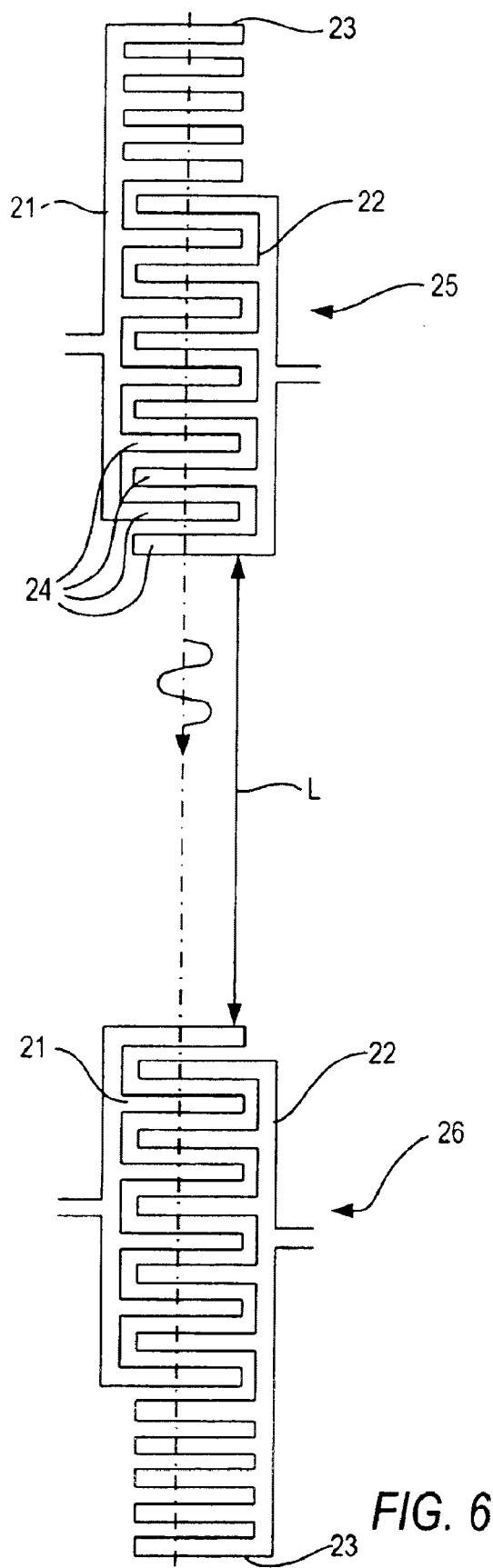
FIG. 6, a first example for the makeup of a surface wave resonator that is suitable as a second resonator for a sensor such as the sensor of FIG. 2.

FIG. 6 shows that the second resonator has two spaced apart pairs 25, 26 of electrodes 21, 22, with a spacing distance L. The electrodes 21, 22 have a plurality of comb-like fingers 24 that engage in on another. Such resonators, for example, can be formed as surface wave filters with a first electrode pair 25 for stimulating the surface waves and a spaced apart electrode pair 26 for reading the surface wave, whereby the two electrode pairs 25, 26 are separated from one another by a spacing distance L.

Figure 7:
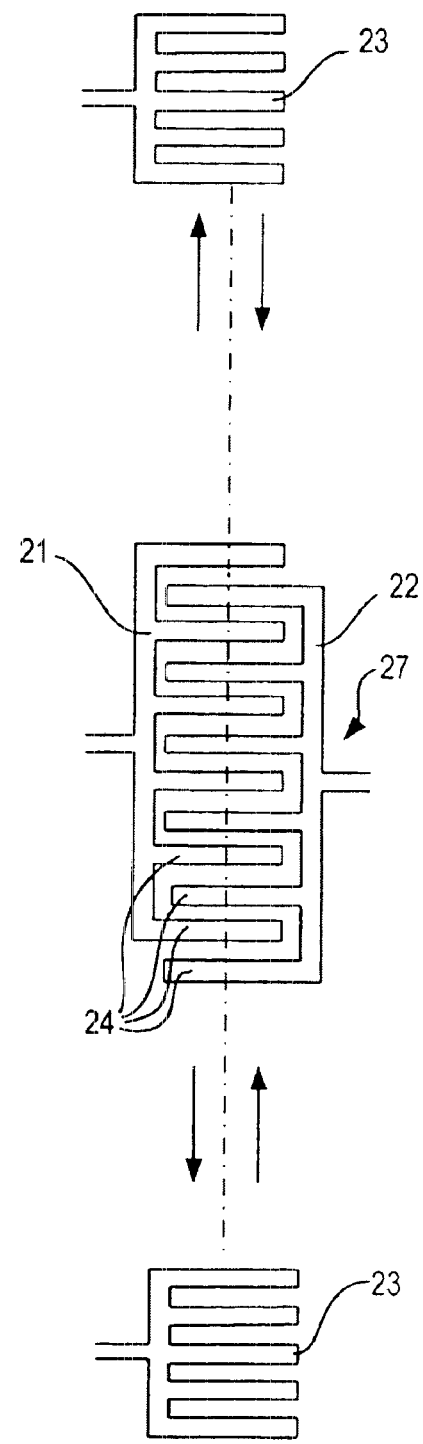
FIG. 7, a second example for the makeup of a surface wave resonator.

FIG. 7 shows that the second resonator has a pair 27 of electrodes 21, 22 for stimulating and reading a surface wave and reflector electrodes 23 arranged to be spaced apart from the electrode pair 27. The electrodes 21, 22 have a plurality of comb-like, parallel fingers 24 that engage in one another. The reflection electrodes 23, respectively, have parallel fingers. The resonators can be formed with an individual electrode pair 27, whereby the individual electrode pair 27 serves to stimulate as well as reade the surface wave. Reflector electrodes 23 are arranged, respectively, at a distance from the electrode pair 27. In order to reflect surface waves propagated in the substrate of the resonators with a time delay to the electrode pair 27.

Figure 8:
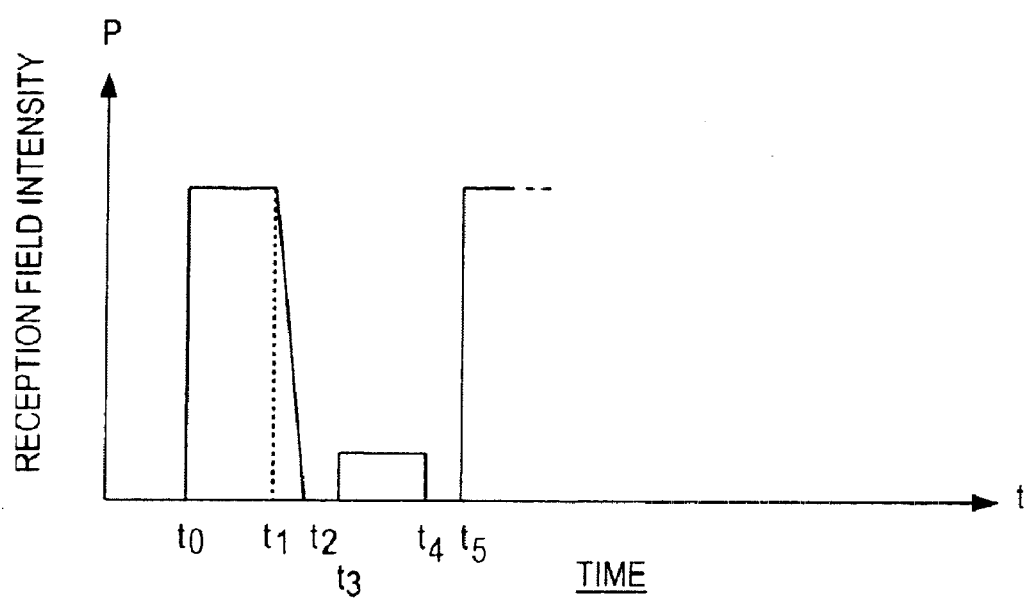
FIG. 8, the course over time of the intensities of the radio signals at the antenna array when a second resonator of the type shown in FIG. 5

FIG. 8 schematically illustrates the course of the reception field intensity P at the antenna 11 of the polling unit as a function of the time t in the course of one polling cycle that results when a surface wave resonator of the design shown in FIG. 6 or FIG. 7 is used as the second resonator of the sensor.

Just as in the case of FIG. 5, the polling radio signal is broadcast during a time period from $t=t_0$ to $t=t_1$. At time $t_1$, the broadcasting of the polling radio signal is interrupted; the reception field intensity P at the antenna 11 decreases to the extent that echos of the polling radio signal that are thrown back from the environment of the antenna 11 fade.

At time $t_3=t_1+\tau$ (ignoring signal transit times between the polling unit and the sensor), the surface wave, which has been induced in the second resonator 3 by the sensor during the reception of the polling radio signal, begins to reach the pair of electrodes at which it is picked up, so that from time $t_3$ on, a modulated answering radio signal is generated at the sensor. Because the length of the second resonator 3 or the delay $\tau$ within this resonator 3 is selected to be great enough, it is possible to achieve a pause in reception, between the fading of the echos at time $t_2$ and the arrival of the answering radio signal at time $t_3$, of negligible reception field intensity, which is detectable by the demodulation and measuring circuit 17 of the polling unit and allows the polling unit to distinguish unambiguously between an echo and an answering radio signal. At time $t_4=t_1+\tau$, the surface wave oscillation has completely traversed the electrode pair that is picking up the signal, and the generation of the answering radio signal ceases.

After a brief further delay, upon renewed broadcasting of the polling radio signal at time $t_5$, a new work cycle of the polling unit of the sensor begins.

Figure 2:
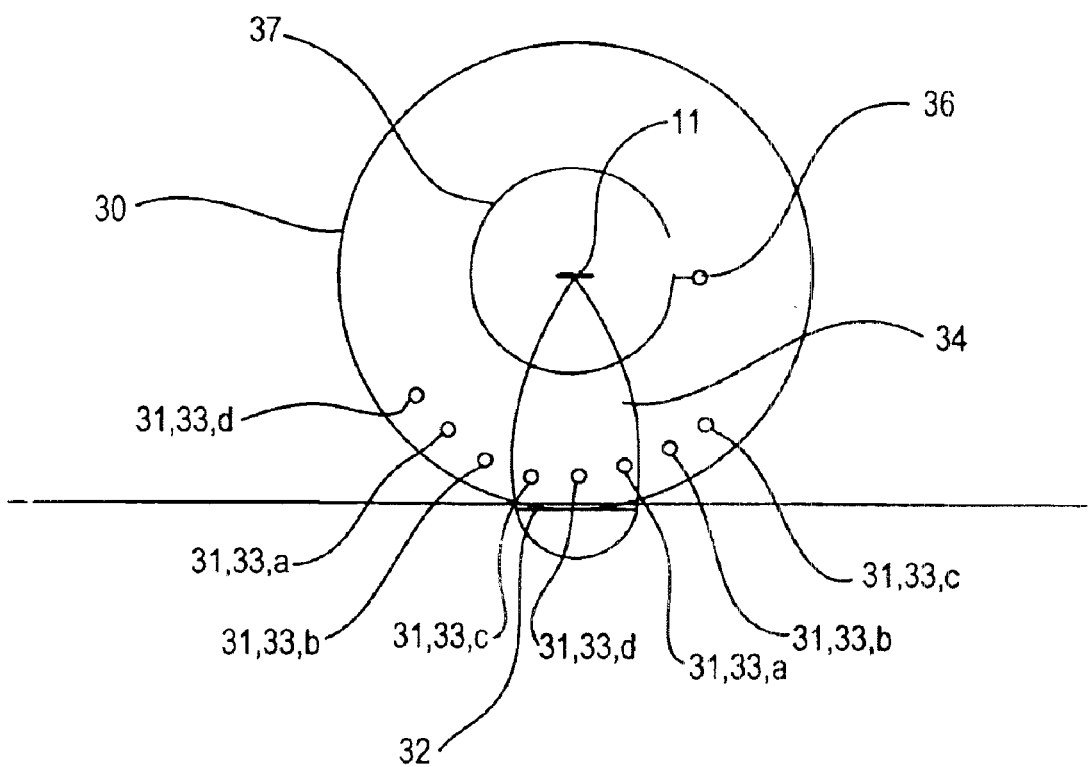
FIG. 2, a schematic illustration of a vehicle wheel that is equipped with a sensor system of the invention, in a second exemplary embodiment.

FIG. 2 shows a more sophisticated embodiment of the sensor system of FIG. 1. Here only two sensors 33 are disposed at each position 31 on the circumferential surface of the tire, and each sensor is sensitive to either force or acceleration in the directions tangential to the surface of the pneumatic tire. Their makeup is the same as described above in conjunction with FIG. 1, 3, 5 or 6.

The sensor, sensitive to a force or acceleration in the radial direction, located at each position 31 in FIG. 1 is replaced here by a single sensor 36, which measures the dynamic internal pressure of the pneumatic tire. From this internal pressure, or its changes, a conclusion can be drawn as to the force acting on the pneumatic tire 30 in the radial direction. This sensor 36 has an antenna 37 or antenna array, which extends to some length along the circumferential direction of the pneumatic tire and one part of which, in every rotational position of the pneumatic tire, is located inside the lobe 34 of the antenna 11, so that the pressure sensor 36 can be polled at any arbitrary instant.

The single pressure sensor 36 thus replaces all the sensors for the force or acceleration in the radial direction of the exemplary embodiment of FIG. 1. This makes a considerable reduction in the number of sensors possible, compared to the exemplary embodiment of FIG. 1. For instance, assuming a circumference of the pneumatic tire 30 of about 2 meters and a spacing between positions 31 of the individual sensors of about 10 cm, the number of sensors required is reduced from 3×20=60 in the case of the exemplary embodiment of FIG. 1 to 2×20+1=41 in the case of FIG. 2.

In the exemplary embodiments shown in FIGS. 1 and 2, the length of the lobe 34 in the circumferential direction and the spacing of the sensor positions is selected such that at every instant, three positions 31 are located inside the lobe 34. This means that at every instant, either nine or seven sensors (six sensors 33 for the tangential directions, and the pressure sensor 36) can be addressed by the polling radio signal of the antenna 11. For usable remote polling, it is necessary to be able to distinguish between the answering radio signals that originate at a plurality of sensors disposed at the same position and the answering radio signals furnished by sensors at different positions 31. To that end, coding of the radio signals is necessary. Software coding is not appropriate here, first because of the processing times associated with executing a program and second because the sensors can obtain the energy required for such coding only from the polling radio signal, and such energy is scarce.

Coding with the aid of the carrier and measurement frequencies of the radio signals exchanged between the antenna 11 and the sensors is therefore employed. The sensors 33 distributed over the circumference of the pneumatic tire 30 are each divided up into a plurality of groups; in the examples of FIGS. 1 and 2 this number of groups has been arbitrarily defined as four, and depending on which of the four groups their sensors 33 belong to, the positions 31 are each marked a, b, c, or d in FIGS. 1 and 2.

In a first variant, the carrier frequency $f_T$ of the polling radio signal is the same for all of the sensors 33, and the second resonators 3 of all the sensors 33 are tuned to this carrier frequency $f_T$. The first resonators have tuning ranges that differ within a group depending on the dimensional variable to be detected by the sensor 33 and that moreover differ from one group to another. In the case of FIG. 2, for example, if it is assumed that the tuning ranges of the first resonators 5 each have a width of 1 MHz, then the following association of tuning ranges with groups and dimensional variables can be made:

| Group | Force in travel direction | Force in traverse direction |
|---|---|---|
| a | 0–10 MHZ | 40–50 MHZ |
| b | 10–20 MHZ | 50–60 MHZ |
| c | 20–30 MHZ | 60–70 MHZ |
| d | 30–40 MHZ | 70–80 MHZ |

The polling unit is thus capable, by selecting the measurement frequency, of selectively exciting only the first resonators of on group, and within this group only the first resonators of the sensor 33 that is associated with a certain dimensional variable, so that the answering radio signal received following this excitation can only come from the sensor 33 thus addressed.

It is understood that it is also possible to modulate a plurality of measurement frequencies to the answering signal, so that answering radio signals are received simultaneously from a plurality of sensors 33, and the measurement frequencies of the answering radio signals that overlap chronologically can be broken down spectrally in the polling unit, so as to associate them with the individual sensors 33, or the dimensional variables monitored by them.

Another possibility is to assign different carrier frequencies, in the same tuning ranges of the first resonators 5, to various sensors 33 disposed at the same position 31 and belonging to the same group. In this way, from each of these sensors answering radio signals can be received which while they have the same measurement frequencies, or more precisely measurement frequencies within the same tuning range, are nevertheless distinguishable from one another in the polling unit on the basis of their different carrier frequencies and can thus be associated correctly with the dimensional variables to be detected.

If two dimensional variables are to be detected at one position 31, it may also be expedient to construct the antennas 1 of the sensors 33 with polarization sensitivity. For instance, the antenna 1 of a sensor 33 that detects a force in the travel direction can be sensitive only to a polling radio signal polarized parallel to the travel direction, and a sensor 33 disposed at the same position 31 for detecting the force transversely to the travel direction is sensitive to a polling radio signal polarized transversely to the travel direction. The polarizations of the answering radio signals broadcast by the two sensors 33 differ correspondingly, so that the polling unit can distinguish the answering radio signals from their polarization.

While the vehicle is in motion, all the sensors of the wheel should be polled continuously. To that end, in a simple embodiment, the lobe 34 of the antenna 11 can be dimensioned such that essentially only one position 31 at a time is ever located inside the lobe 34. To avoid interference with the dimensional variable from sensors located at the periphery of the lobe 34, a very sharply defined spatial boundary of the lobe 34 is necessary in that case.

In an advantageous alternative in this respect, the size of the lobe 34 of the antenna 11 in the circumferential direction of the pneumatic tire 30 is on the one hand large enough that a plurality of positions 31 are always located inside this lobe 34, yet on the other hand not so large enough for there to be room in it for the sensors of all the groups. In the position of the wheel shown in FIG. 1 and FIG. 2, the polling unit can excite sensors in each of the groups c, d and a and receive answering radio signals from them, but sensors of group b are not located in the lobe 34. Since the groups a, b, c, d follow one another cyclically, the polling unit can conclude from the absence of an answering radio signal from group b that the sensors of groups a and c must be located in the vicinity of the edge of the flattened region 32, and that the sensor of group d must be located in the middle of the flattened region 32. At the edge of the region 32, there is a strong flexing motion on the part of the material comprising the pneumatic tire 30, and as a result the sensors of groups a and c can be subjected to powerful forces. The sensor of group d, conversely, must be located in the middle of the flattened region 32, i.e. at the place where the flexing motion is only slight, yet the transmission of force between the pneumatic tire 30 and the roadway is most effective. The answering radio signal furnished by this sensor thus makes it possible to draw the precisest possible conclusion about the quality of road adhesion of the pneumatic tire. The polling unit therefore identifies the answering radio signal of the sensor of group d from its characteristic measurement frequency and for instance causes a warning signal to be output to the vehicle driver if the instantaneous value of this measurement frequency, which represents the force detected by the sensor in group d, departs from a desired range. In this way the driver can be warned even before the road adhesion of the vehicle is lost, for instance from aquaplaning or traveling on an icy surface, and the risk of accidents can be reduced.

What is claimed is:

1. A sensor system for detecting at least one dimensional variable of a rotating object (30), having at least one sensor, disposed on the rotating object (30) and sensitive to the dimensional variable, and having means for picking up measurement signals from the at least one sensor and forwarding the signals to a processing device, which include an antenna array (11) for supplying the at least one sensor with high-frequency energy end for receiving a high-frequency signal, modulated as a function of the variable to be detected, from the sensor, characterized in that a plurality of such sensors are disposed on the object (30), distributed in the circumferential direction; and that the antenna array (11) has a directional characteristic (34) for transmission and/or reception which is stationary with respect to a coordinate system not rotating with the object (30) and which includes only a subregion (32) of the object (30).

2. The sensor system of claim 1, wherein the subregion is the contact face of the object (30), with a substrate.

3. The sensor system of claim 1, wherein the antenna array (11) includes a common antenna for transmission and reception.

4. The sensor system of claim 1, wherein sensors used to detect the same physical variable have a spacing in the circumferential direction of the object (30) that is essentially equivalent to the length of the subregion (32) in the circumferential direction.

5. The sensor system of claim 1, wherein the sensors have coding, which makes it possible to supply high-frequency energy selectively to at least one sensor from among a plurality of sensors located in the subregion (32), or to receive selectively from at least one sensor located in the subregion.

6. The sensor system of claim 5, wherein the sensors form a predefined number of groups, which are each distributed cyclically over the circumference of the object (30).

7. The sensor system of claim 6, wherein the subregion is defined such that the sensors of all of the predefined number of groups are never all located in it at the same time.

8. The sensor system of claim 1, wherein each sensor has a first resonator (5), which can be excited by a modulated measurement frequency of a carrier frequency of the high-frequency energy, and whose resonant frequency is variable as a function of the dimensional variable.

9. The sensor system of claim 8, wherein the first resonator (5) includes a surface wave resonator or a quartz oscillator.

10. The sensor system of claim 9, wherein the first resonator (5) further includes a discrete component (6) that is sensitive to the dimensional variable.

11. The sensor system of claims 5, wherein one specific resonator tuning range corresponds to each coding.

12. The sensor system of claim 11, wherein the resonator tuning ranges of the individual codings are disjoint.

13. The sensor system of claim 1, wherein the dimensional variable is a vectorial variable, and in particular a force or acceleration.

14. The sensor system of claim 13, wherein the sensors are each designed for detecting two components of the dimensional variable that are perpendicular to one another and tangential to the surface of the object.

15. The sensor system of claim 1, wherein the object (30) is a pneumatic tire.

16. The sensor system of claim 15, wherein it also has an individual sensor (36) for the tire pressure.

17. The sensor system of claim 1, wherein each sensor has a second resonator (3) that can be excited by a carrier frequency of the high-frequency energy.

18. The sensor system of claim 17, wherein the second resonator (3) is a surface wave resonator.

19. The sensor system of claim 18, wherein the second resonator (3) is capable of generating a delayed output oscillation pulse in reaction to an induced oscillation pulse.

20. The sensor system of claim 19, wherein the second resonator (3) has a propagation distance (L) for the surface wave that a surface wave induced in the second resonator (3) must traverse before it is picked up.

21. The sensor system of claim 19, wherein the second resonator has two three-dimensionally spaced-apart pairs (25, 236) of electrodes (21, 22).

22. The sensor system of claim 19, wherein the second resonator has one pair (27) of electrodes (21, 22), for inducing and picking up a surface wave, and reflector electrodes (23), spaced apart from the pair (27) of electrodes.

* * * * *